July 2, 1929.                L. PALUDET                1,719,671
              VARYING CHANGES OF THE SPEED IN BICYCLES,
                    TRICYCLES, AND SIMILAR MACHINES
                          Filed Jan. 14, 1928

Inventor:
L. Paludet

Patented July 2, 1929.

1,719,671

UNITED STATES PATENT OFFICE.

LUIS PALUDET, OF ROSARIO DE SANTA FE, ARGENTINA.

VARYING CHANGES OF THE SPEED IN BICYCLES, TRICYCLES, AND SIMILAR MACHINES.

Application filed January 14, 1928, Serial No. 246,802, and in Argentina January 28, 1927.

This invention relates to means for effecting change-speed gear ratios in bicycles, tricycles and similar devices, and has for its object the provision of means by which the driving chain may be selectively engaged with any one of a plurality of different sized sprockets on the rear or driving wheel of the bicycle so as to obtain the desired speed ratio.

Other objects of the invention will appear as the following description of the preferred embodiment thereof proceeds.

Figure 1:
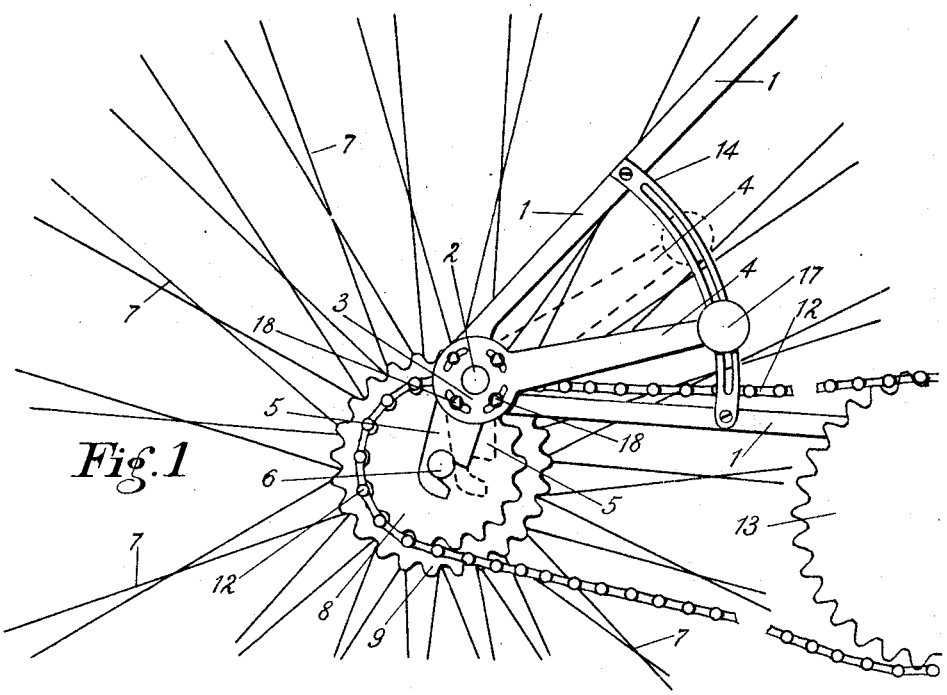
Fig. 1 is a side elevation of a portion of a bicycle to which the invention has been applied, two positions being indicated, one by broken lines.

Referring now in detail to the several figures in which the same reference characters have been used to designate identical or similar parts, the numeral 1 represents the rear part of the bicycle frame, 13 being the usual front or driving sprocket, 7 being the wheel of ordinary construction, and 12 representing the usual chain.

Figure 2:
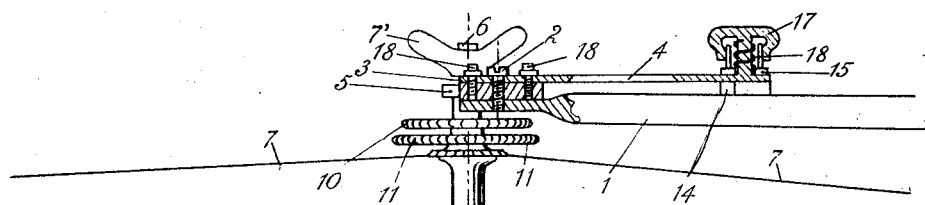
Fig. 2 is a plan view partly in section, of that part of the bicycle shown in Fig. 1.
Figure 3:
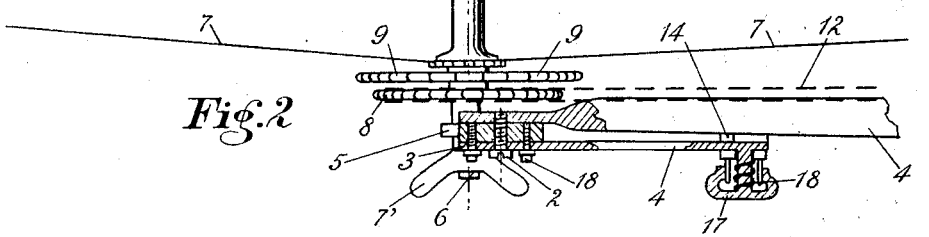
Fig. 3 is a front view in elevation of the sector showing the detent in two positions, one being indicated in broken lines.

The axle of the rear wheel is shown at 6. Customarily the ends of the axle are fixed in suitable slots or apertures in the rearmost ends of the frame 1. In the application of the present invention, this practice is not followed but the axle 6 is fixed in an auxiliary fork comprising a pair of bell crank levers 3 of similar size and construction, themselves pivotally mounted in the rearmost ends of the frame 1 by means of pivot studs 2, best shown in Fig. 2.

The bell crank levers each comprise two relatively adjustable arms 4 and 5 having their adjacent ends overlapping and in contact, said ends being apertured so as to bear rotatably upon the pivot studs 2. One of the contacting ends of the arms of each bell crank lever, for instance the end of the arm 5 as shown, is provided with studs 18 passing through slots in the corresponding end of the other arm of said lever. Thus when desired, a limited amount of relative rotation is permitted between the arms 4 and 5, limited by the length of the said slots, said rotation being inhibited and the parts made rigid by tightening the nuts with which the studs 18 are provided. The lower arms 5 of the bell crank levers are provided with open slots receiving the ends of the axle 6. Said axle is maintained rigidly in said slots by means of the thumb nuts 7' which screw frictionally against the sides of the arms 5. It is obviously a very simple matter, by loosening the thumb nuts, to remove the axle and wheel from the slotted ends of the arms 5. The arms 4 of the bell crank levers slidably engage sectors 14 rigidly secured to the frame 1 at opposite sides. Said sectors may be of any suitable construction and the engaging ends of the arms 4 may likewise be constructed as desired, but in the preferred form of the invention here shown, the sectors are slotted and the arms 4 are provided with lateral lugs which pass through said slots, said lugs being each provided with an operating knob 17. A spring 18' normally maintains the arms 4 in yielding frictional contact with the sectors. The arms 4 are provided with detents adapted to seat in notches formed in the sectors, thus determining the positive stages of adjustment of the auxiliary fork.

The wheel axle 6 is provided with a plurality of gears of different size, that is to say, having different numbers of teeth. One of these gears 8 is shown as being in operative alinement with the chain 12. In order to transfer the chain to the larger gear 9 which adjoins the gear 8, it is merely necessary to release the detent from the notch 15 in which it is engaged by pulling upon the knob 17 and then shifting the arms 4 of the bell crank levers so as to swing the arms 5 in a direction towards the driving sprocket 13. This, of course, brings the axle 6 closer to the sprocket 13 and loosens the chain so that the latter may be taken off of the gear 8 and arranged upon the larger gear 9. The arms 4 of the bell crank levers are then again moved downwardly so as to swing the arms 5 in a direction away from the sprocket 13 so as to properly tighten the chain. The knob 17 is then let go, permitting the detent to fall in the nearest one of the notches 15. If the chain is not properly adjusted as to tautness by the major steps of adjustment provided by the notches 15, finer adjustment is made possible by means of the relative rotative adjustment provided between the contacting ends of the arms 4 and 5.

The wheel axle may be provided on its opposite side with additional gears of still different sizes. To bring these into operative relation to the chain it is necessary that the thumb nuts 7' shall be loosened, the wheel and axle entirely removed from the arms 5 and completely reversed. This, however, in the present invention, is quite a simple operation.

While I have in the above description endeavored to define what I believe to be a preferred and practical embodiment of my invention, it is to be understood that the specific features herein disclosed are merely by way of example and not to be considered limitative in their bearing upon the scope of the invention which is to be determined by a liberal interpretation of the appended claims.

What I claim is:

1. A device for effecting change speed gear ratios in bicycles and the like, comprising a driving wheel axle having side by side, gears of different size, a fork pivoted to the rear frame of the bicycle in the ends of which said axle is mounted, said fork being swingable to and from the driving sprocket of the bicycle to permit the bicycle chain to be manually transferred from one of the said gears to another, a lever forming part of said fork, a fixed sector with which said lever cooperates, and means for holding said lever in a plurality of positions of adjustment with respect to said sector.

2. A device for effecting change speed gear ratios in bicycles and the like as claimed in claim 1, said sector having a plurality of detent engaging portions defining major steps of adjustment of said fork, and means for adjusting said lever with respect to the axle carrying portion of said fork.

3. A device for effecting change speed gear ratios in bicycles and the like, comprising a driving wheel axle having side by side gears of different size, a fork pivoted to the rear frame of the bicycle in the ends of which said axle is mounted, said fork comprising a pair of bell crank levers each comprising an arm receiving the end of said axle and an arm for adjusting said fork, said arms being adjustably connected, means on the frame of said bicycle engaging said fork adjusting arms for holding said fork in rigid position of adjustment, the axle carrying arms having open slots receiving said axle.

4. A device for effecting change speed gear ratios in bicycles and the like, comprising a driving wheel axle having side by side gears of different size, a fork pivoted to the rear frame of the bicycle in the ends of which said axle is mounted, said fork comprising a pair of bell crank levers each comprising an arm receiving the end of said axle and an arm for adjusting said fork, said arms being adjustably connected, means on the frame of said bicycle engaging said fork adjusting arms for holding said fork in rigid position of adjustment, the axle carrying arms having open slots receiving said axle, and thumb nuts for securing the said axle to the said slots.

5. A device for effecting change speed gear ratios in bicycles and the like, comprising a driving wheel axle having side by side, gears of different size, a fork pivoted to the rear frame of the bicycle in the ends of which said axle is mounted, said fork being swingable to and from the driving sprocket of the bicycle to permit the bicycle chain to be manually transferred from one of the said gears to another, a lever forming part of said fork, and means for retaining said lever rigid with respect to said frame.

In testimony whereof I affix my signature.

LUIS PALUDET.